(No Model.)
J. O. DE WOLF.
APPARATUS FOR REPAIRING PNEUMATIC TIRES.
No. 561,378. Patented June 2, 1896.
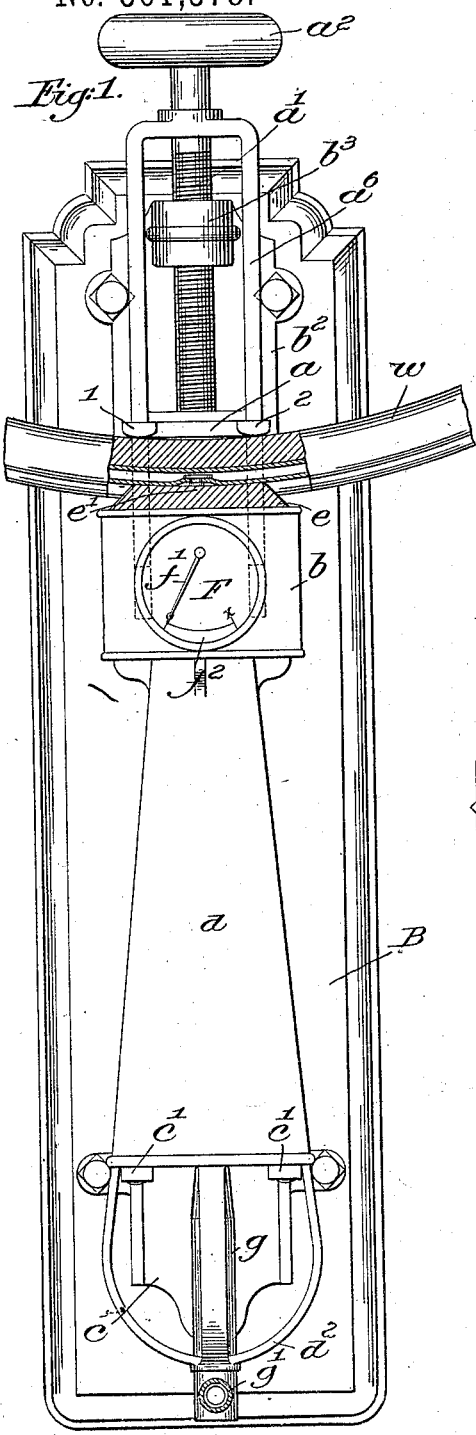
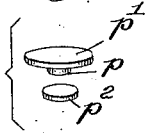
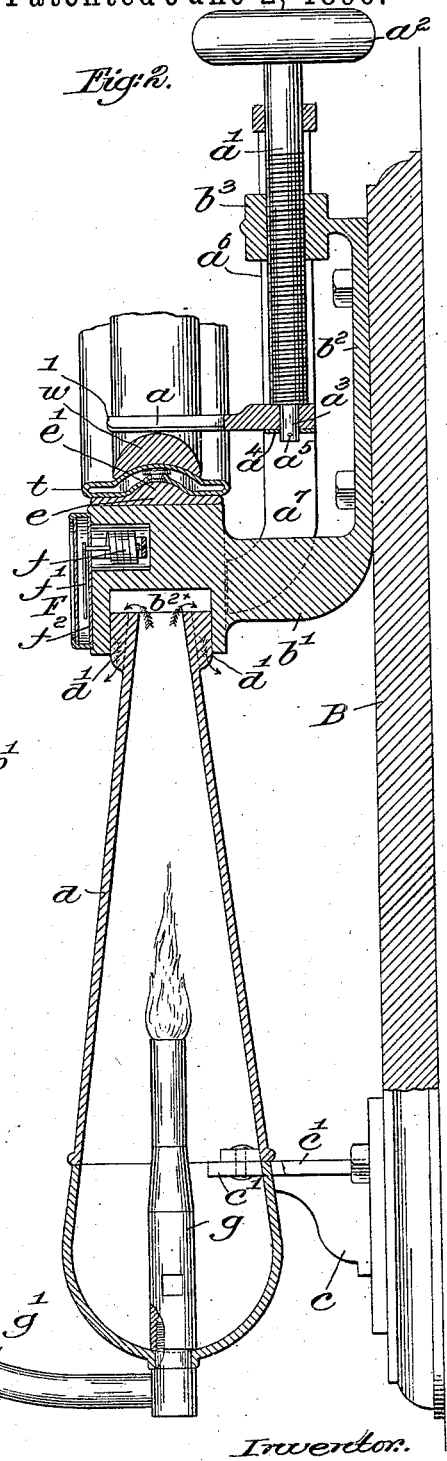
Witnesses.
Fred S. Greenleaf
Thomas J. Drummond
Inventor.
John O. De Wolf.
by Crosby & Gregory
attys

UNITED STATES PATENT OFFICE.

JOHN O. DE WOLF, OF CAMBRIDGE, MASSACHUSETTS.

APPARATUS FOR REPAIRING PNEUMATIC TIRES.

SPECIFICATION forming part of Letters Patent No. 561,378, dated June 2, 1896.

Application filed January 13, 1896. Serial No. 575,256. (No model.)

*To all whom it may concern:*

Be it known that I, JOHN O. DE WOLF, of Cambridge, county of Middlesex, State of Massachusetts, have invented an Improvement in Apparatus for Repairing Pneumatic Tires, of which the following description, in connection with the accompanying drawings, is a specification, like letters and figures on the drawings representing like parts.

This invention relates to apparatus for repairing with facility pneumatic tires for bicycles.

Prior to my invention when a tire has been punctured while on the road it has been necessary for the rider to repair the tire as best he could by winding it with tape or in some other crude and temporary manner or send the tire to the manufactory for permanent and thorough repair.

The principal aim of my invention has been to provide something in the nature of a portable apparatus which can be set up in any store or building, however remote from the manufactory where tires are made or repaired on a large scale, and by means of which a tire may be repaired quickly and as thoroughly as when sent to the manufactory.

My aim is to distribute apparatus embodying my invention throughout small towns or at frequent intervals on long roads where the rider may have his punctured tire repaired quickly and at small expense without necessitating his travel on foot for many miles or the use of a railroad to reach home.

My invention broadly consists in a plurality of suitable clamping members adapted to be secured on the wall of a room, or in other suitable convenient position, with means for moving said clamping members one toward the other for the purpose of firmly holding or clamping the tire between them in the course of repairing the same. In connection with these clamping members I arrange in suitable position a support for a heating device, preferably a lamp or a gas-burner, with preferably a suitable hood leading from the same to one of the clamping members, whereby the latter will be heated while holding the punctured tire to such a temperature as will cause the rubber of the tire or the plug inserted in the puncture to flow and effectually and permanently close the puncture. For the best results the heating-flame should not be permitted to come into direct contact with the clamping members which it is designed to heat, but it should be removed therefrom by quite a considerable distance and the heated air and products of combustion rising from the flame conducted to the said clamping members by the conductor or hood referred to.

Prior to my invention, so far as I am aware, it has been usually if not universally considered necessary for the repair of a pneumatic tire to first remove the tire from the wheel in order that said tire might be compressed into flat or nearly flat condition to insure perfect and permanent closure of the puncture.

The objection heretofore encountered to the repair of the tire while it is in position on the wheel has been that the wheel rim or filling is usually provided with a concave peripheral surface into which the tire contracts when deflated. My present invention, however, comprehends the use of a crowning-surface to be applied to or arranged on one of the clamping members referred to, and which is capable of pressing the tire into the hollow of the rim, so that the tire may be compressed and repaired while on the wheel, thus effecting a material saving in time and trouble.

The above, together with other features of my invention, will be hereinafter fully described, and set forth in the claims at the end of this specification.

In the drawings, Figure 1, in front elevation, partially broken away, shows one embodiment of my invention; Fig. 2, a side elevation, partially broken away, of the device, Fig. 1; Fig. 3, a detail showing one form of plug used in the repair of tires.

In the particular embodiment of my invention selected for illustration of the same and shown in the drawings, $a$ $b$ represent two clamping members adapted to clamp a tire between them, the clamping member $b$, as herein shown, being rectangular in shape and nearly or quite solid, that it may better retain the heat imparted to it, said clamping member $b$ being shown as mounted upon an arm $b'$ of the plate $b^2$, bolted or otherwise secured to the back B of suitable shape and construction herein adapted to be secured to a side wall with the parts in convenient position for use.

The plate $b^2$, as herein shown, is provided with a lug $b^3$, tapped to receive the clamping-screw $a'$, provided at its upper end with a suitable hand-wheel $a^2$, and at its lower end having a reduced shank portion $a^3$, which is extended through the inner end of the upper clamping member $a$, a suitable washer $a^4$ and pin $a^5$ (see Fig. 2) serving to connect said clamping member $a$ with the adjusting-screw, whereby vertical movement of the screw due to rotation thereof causes a rise and fall of the clamping member $a$.

In the present embodiment of my invention the clamping member $a$ is provided at its upper side with a yoke $a^6$, which spans the lug $b^3$ and has its crown provided with an opening through which the upper threaded shank portion of the clamping-screw is passed, said screw thereby constituting a guide for the clamping member, said clamping member being also provided, as herein shown, with two downwardly-extended arms $a^7$, (shown as continuations of the two members of the yoke $a^6$,) which members $a^6$ have their ends turned outwardly toward and to act loosely upon the inner faces of the clamping member $b$ to thereby further act as guides for the clamping member $a$.

Below the clamping member $b$, and in the present instance mounted upon the back B, I have shown a bracket $c$, (shown as forked to present two supporting-arms $c'$ $c'$,) upon which is supported the hood $d$, preferably conical in shape and leading upwardly to and at its smaller end entering the recess $b^2$ in the under side of the clamping member $b$, said hood at its upper end being separated from the side walls of the said recess, except at the radial ribs $d'$, provided to hold the said hood at its upper end against vibration within said recess. At its lower end the hood $d$ is shown as provided with a plurality of bail-like arms $d^2$, in which is mounted and supported the heat-generator, shown as a gas-burner $g$, which may be connected in suitable manner, as by a flexible pipe $g'$, with the nearest gas-supply.

The tip of the burner $g$ is arranged in such position that the flame from the burner will not at any time reach and directly contact with the clamping member $b$, but so that said flame shall at all times terminate somewhat short of said clamping member in order that the latter may not be heated to such a degree as would scorch the tire thereupon.

Upon the clamping member $b$ I have arranged what might be called an "anvil-block" $e$, (shown as provided with a crowning-surface $e'$ when viewed in cross-section, Fig. 2,) yet for the best results made longitudinally concaved, as shown in Fig. 1, which crowning-surface is so shaped as to press a deflated tire $t$ firmly into the concaved peripheral face of a wheel-rim $w$, as best shown in Fig. 2.

To repair a tire by the apparatus described, the tire being preferably in a deflated condition, I prefer to fill the puncture with a quantity of rubber, in the form of a plug or otherwise, I having, for the sake of illustration, shown a common plug $p$, Fig. 3, which is in the form of a teat, and the washer $p'$, which latter is by suitable appliances forced through the puncture to the inside of the tire, leaving the teat in and filling the puncture, as shown in the drawings. The teat is then pared down flush with the tread or outer surface of the tire and a small washer $p^2$ is preferably applied at the top of the teat and the wheel with the tire thereupon placed between the clamping members, as shown in the drawings, with the puncture down on the washer $p^2$ upon the crowning-surface of the anvil-piece $e$. By means of the screw $a'$ the clamping member $a$ is now moved downwardly to crowd the wheel-rim and tire down upon the crowning-surface $e'$, to thereby firmly compress the washers $p'$ and $p^2$ and the interposed teat tightly together, the wheel-rim serving as an abutment at one side and the crowning-surface $e'$ as an abutment at the other side. While the tire is thus firmly clamped the burner is started and the heat from the burner-flame raises the clamping member $b$ and the block $e$ thereupon to such a temperature as will cause the rubber contained in the tire and teat with its adjacent washers to flow together and effectually and permanently seal the puncture, all without removing the tire from the wheel. After permitting the tire to remain thus clamped for several minutes the clamping member $a$ is relieved and the tire removed in condition for use, lacking only inflation.

Should there be any tendency of the washer $p'$ to adhere to the back part of the tire, the inflation of the tire will act quickly to separate the same without injury to either tire or washer.

My invention, of course, is not restricted to the particular manner herein disclosed for filling or closing the puncture preparatory to flowing the same by the heat from the apparatus, for any suitable means may be used so long as the heat for the apparatus, while the tire is under clamping-pressure, operates to flow the rubber or closing material and seal the puncture.

It will be noticed that the products of combustion from the flame with the heated air also rising therefrom pass through the hood to the recess $b^2$, within the clamping member $b$, to heat the said clamping member, the side walls of the said recess constituting deflectors to deflect the heated air and products of combustion in such a direction as will prevent the latter, when in a highly-heated condition, impinging upon and to burn the tire, as would be the case were not deflecting walls provided.

Of course the tire may be detached from the wheel and repaired in the usual flattened condition, in which case the block $e$, with its crowning-surface, will be removed and the tire clamped directly and in a flattened condition between the two clamping members.

In the present instance I have made the clamping member a as a fork, it presenting two arms 1 and 2 to engage the wheel-rim at points, say, one inch or more from each other, in order that suitable provision may be provided for a spoke of the wheel in case the puncture should be directly beneath the spoke, as indicated in the drawings, wherein a spoke is shown as broken off.

In order that the temperature may not be raised to an excessive degree, I have recessed the clamping member $b$ at the front side to receive the coil $f$ of a suitable thermometer or heat-indicating device F, the pointer $f'$ of which is caused to travel over a suitable scale, (indicated at $f^2$, Fig. 1,) which shows at all times the temperature of the clamping member and the degree of heat applied to the tire.

The apparatus described is small and convenient and is adapted to be secured in position in any country store or building wherein are lacking the facilities heretofore considered essential for the proper repair of a punctured tire.

If gas for a fuel is not at hand, I may arrange beneath the hood $d$ a lamp, or the heat may be applied in any other desired manner.

If the plug or filling inserted in the puncture be crude or raw rubber, it will be caused to flow into union with the surrounding material and harden, or, as some might term it, be "vulcanized;" but if, as is frequently the case, the filling material is more or less vulcanized before insertion—for example, the rivet-like plug herein mentioned, which must be partially cured or vulcanized to enable it to be handled—the change that takes place either with or without the use of a cementitious material could hardly be called "vulcanization," and in some instances where a fully-vulcanized plug is employed the union may be effected by an interposed film of rubber cement, which, acted upon by the heat from the clamping members or either of them, will firmly secure the plug or filling in position.

My invention is not necessarily limited to the particular construction herein shown, for it is evident that the same may be varied without departing from the spirit and scope of my invention.

Having described my invention, and without limiting myself as to details, what I claim, and desire to secure by Letters Patent, is—

1. In an apparatus of the class described, the combination with the clamping members and means to move the same one toward the other, of a burner-support and a burner arranged thereon, at such distance from said clamping members or either of them as will prevent direct contact of the burner-flame therewith, and a hood leading from said burner or its flame to one of said clamping members, substantially as described.

2. In an apparatus of the class described, the combination with the clamping members and means to move the same one toward the other, of a gas-burner arranged beneath one of said clamping members, and a conducting-hood leading from said burner to said clamping members to convey heat to the latter, substantially as described.

3. In an apparatus of the class described, the combination with the clamping members and means to move the same one toward the other, of a burner-support beneath one of said clamping members, a burner thereon, a heat-conducting hood leading from the burner to the clamping member above, and deflector-walls on the said clamping member to deflect the escaping heated air and products of combustion away from and to prevent burning the tire held between the said clamping members, substantially as described.

4. In an apparatus of the class described, the combination with a suitable support, the fixed and movable clamping members applied thereto and means to move the same one toward the other, of a burner-support arranged beneath one of said clamping members, a burner thereon, a heat-conducting hood leading from said burner to the clamping member above, and a heat-indicating device applied directly to the said heated clamping member to show the temperature thereof, substantially as described.

5. In an apparatus of the class described, the combination with the clamping members, means to move the same one toward the other, one of said clamping members having a plurality of arms between which may be arranged one or more spokes of a wheel, of a crowning-surface on the opposing clamping member adapted to press the surface of a tire into the hollow of the wheel-rim, substantially as described.

In testimony whereof I have signed my name to this specification in the presence of two subscribing witnesses.

JOHN O. DE WOLF.

Witnesses:
ROBERT COWES,
J. W. FELLOWS.